(12) United States Patent
Van Der Sluis (10) Patent No.: US 10,816,449 B2
(45) Date of Patent: Oct. 27, 2020

(54) OPTICAL PARTICLE DETECTOR

(71) Applicant: KONINKLIJKE PHILIPS N.V., Eindhoven (NL)

(72) Inventor: Paul Van Der Sluis, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/340,818

(22) PCT Filed: Oct. 19, 2017

(86) PCT No.: PCT/EP2017/076655
§ 371 (c)(1),
(2) Date: Apr. 10, 2019

(87) PCT Pub. No.: WO2018/077704
PCT Pub. Date: May 3, 2018

(65) Prior Publication Data
US 2019/0265145 A1    Aug. 29, 2019

(30) Foreign Application Priority Data

Oct. 24, 2016  (EP) ..................................... 16195280

(51) Int. Cl.
*G01N 15/02* (2006.01)
*G01N 15/14* (2006.01)
(Continued)

(52) U.S. Cl.
CPC ..... *G01N 15/0211* (2013.01); *G01N 15/1427* (2013.01); *G01N 15/1436* (2013.01);
(Continued)

(58) Field of Classification Search
CPC ........... G01N 15/1436; G01N 15/1431; G01N 15/0211; G01N 15/427; G01N 15/1425;
(Continued)

(56) References Cited

U.S. PATENT DOCUMENTS 4,223,559 A * 9/1980 Chuan .................... G08B 17/12
340/627
8,559,006 B2   10/2013 Penney
(Continued)

FOREIGN PATENT DOCUMENTS

| GB | 2379977 A | 3/2003 |
|---|---|---|
| JP | 0961338 A | 3/1997 |
| JP | 10253624 A | 9/1998 |

OTHER PUBLICATIONS http://www.eoc-inc.com/LEDs-mid%20IR.htm.
(Continued)

*Primary Examiner* — Hoa Q Pham (57) ABSTRACT

Presented is a device for detecting particles, comprising: a first light source positioned for illuminating particles passing through a detection region of the particle detector; a first detector positioned and adapted for detecting light signals from particles illuminated by the first light source in the detection region; a processor configured for determining a type of the particles passing through the detection region from light signals detected by the first detector; characterized in that: the particle detector further comprises: a means for detecting when particles pass through the detection region; and a controller coupled to the means and configured to operate the first light source with a first pulsed current when particles pass through the detection region thereby preserving or extending lifetime of the first light source, and wherein the first pulsed current is selected beyond a continuous current damage threshold of the first light source thereby increasing light output of the first light source.

14 Claims, 3 Drawing Sheets

(51) Int. Cl.
    *G01N 21/64*    (2006.01)
    *G01N 15/00*    (2006.01)
(52) U.S. Cl.
    CPC ......... *G01N 15/1459* (2013.01); *G01N 21/64* (2013.01); *G01N 15/1431* (2013.01); *G01N 2015/0046* (2013.01); *G01N 2015/03* (2013.01); *G01N 2015/1438* (2013.01); *G01N 2201/062* (2013.01)
(58) Field of Classification Search
    CPC ........... G01N 15/1459; G01N 15/1434; G01N 21/47; G01N 21/64; G01N 2015/1438; G01N 2015/0046; G01N 2015/03; G01N 2015/0238
    USPC .................................................. 356/335–343
    See application file for complete search history.

(56)            References Cited

U.S. PATENT DOCUMENTS

| | | | |
|---|---|---|---|
| 2004/0057050 A1* | 3/2004 | Beck | G01N 15/1459 356/336 |
| 2006/0197033 A1* | 9/2006 | Hairston | G01J 3/32 250/458.1 |
| 2008/0003665 A1 | 1/2008 | Potyrailo | |
| 2009/0223279 A1* | 9/2009 | McFarland | B01D 46/04 73/28.05 |
| 2015/0355084 A1 | 12/2015 | White | |
| 2016/0202164 A1* | 7/2016 | Trainer | G01N 15/0211 |
| 2020/0018683 A1* | 1/2020 | Van Der Sluis | G01N 15/1431 |
| 2020/0033250 A1* | 1/2020 | Van Der Sluis | G01N 15/1459 |

OTHER PUBLICATIONS

K. Mitsumoto, K Yabusaki, H. Aoyagi, "Classification of pollen species using autofluorescence image analysis", J Biosci Bioeng. Jan. 2009;107(1):90-4.

Victoria V. Roshchina, "Vital Autofluorescence: Application to the Study of Plant Living Cells", International Journal of Spectroscopy,vol. 2012 (2012), Article ID 124672).

A.V. Zolotukhinolotukhin, V.V. Sherstnev, K.S. Savelieva, E.A. Grebenshchikova, O.Yu. Serebrennikova, N.D. Ilinskaya, S.A. Slobozhanuk, E.V. Ivanov, Y.P. Yakovlev, Journal of Physics: Conference Series 461 (2013) 012036.

Muqing Liu ; Bifeng Rong ; Huub W. M. Salemink, Opt. Eng. 46(7), 074002 (Jul. 2, 2007).

International Search Report/Written Opinion dated Jan. 22, 2018.

https://www.shinyei.co.jp/stc/eng/optical/main_ps2.html.

* cited by examiner

OPTICAL PARTICLE DETECTOR

CLAIM OF PRIORITY

This application is the U.S. National Phase application under 35 U.S.C. § 371 of International Application No. PCT/EP2017/076655, filed on Oct. 19, 2017, which claims the benefit of International Application No. 16195280.9, filed on Oct. 24, 2016. These applications are hereby incorporated by reference herein.

FIELD OF THE INVENTION

The present invention relates to particle detectors. In particular the invention relates to optical particle detectors.

BACKGROUND OF THE INVENTION

Particulate air pollution has been associated with increased morbidity and mortality from respiratory and cardiac disease and with allergic reactions. The precise effects on human health depend on the type and inhalation dosage of the particle present.

Fine particles, larger than about 0.3 micrometer can be counted individually by optical means using existing technology. In most cases a cheap and efficient LED or laser with a red or near infrared wavelength is used. To identify which type of particle is present, the particle must be illuminated with IR and UV wavelengths. The UV can give rise to fluorescence. The IR gives rise to scattering. The ratio can be used to identify the particle. A problem related to this technique is the requirement of professional equipment with high intensity light sources. Such equipment is expensive, large, heavy and therefore not easily accessible to the public. Cheap and lightweight light sources such as light emitting diodes (LED) suffer from insufficient light output.

There is a strong need for a cheap, lightweight and accurate particle detector that can differentiate between different particle types.

SUMMARY OF THE INVENTION

In a first aspect of the invention, a device for detecting particles is presented, comprising: a first light source positioned for illuminating particles passing through a detection region of the particle detector; a first detector positioned and adapted for detecting light signals from particles illuminated by the first light source in the detection region; a processor configured for determining a type of the particles passing through the detection region from light signals detected by the first detector; characterized in that: the particle detector further comprises: a means for detecting when particles pass through the detection region; and a controller coupled to the means and configured to operate the first light source with a first pulsed current when particles pass through the detection region thereby preserving or extending the lifetime of the first light source, and wherein the first pulsed current is selected beyond a continuous current damage threshold of the first light source thereby increasing light output of the first light source.

According to an embodiment of the invention, the first light source is a LED. According to an embodiment of the invention, the first light source is a UV LED, and the first detector is adapted to detect fluorescence. Because of the short life-time of UV LEDs it is an advantage of the invention that the UV LED is only operated with the first pulsed current when particles pass through the detection region. This reduces the usage of the UV LED and thereby increasing its lifetime. According to an embodiment of the invention, the first light source is an IR LED, and the first detector is adapted to detect IR light.

According to an embodiment of the invention, the device further comprises: a second light source positioned for illuminating particles passing through the detection region, the second light source having a wavelength range different than the first light source, and a second detector positioned and adapted for detecting light signals from particles illuminated by the second light source in the detection region, and the controller is further configured to operate the second light source with a second pulsed current when particles pass through the detection region thereby preserving or extending the lifetime of the second light source, wherein the second pulsed current is selected beyond a continuous current damage threshold of the second light source thereby substantially increasing light output of the first light source, and the processor is further configured for determining a type of particles passing through the detection region from light signals detected by the second detector also.

According to an embodiment of the invention, the second light source is a LED. According to an embodiment of the invention, the first light source has an ultraviolet wavelength range, and the first detector is adapted to detect fluorescence; wherein the second light source has an infrared wavelength range, and wherein the second detector is adapted to detect infrared light.

According to an embodiment of the invention, wherein the means for detecting when particles pass through the detection region comprises: another light source positioned for illuminating the detection region; and another detector positioned for receiving light from particles illuminated by the other light source in the detection region. According to an embodiment of the invention, wherein the other light source is a light emitting diode. According to an embodiment of the invention, wherein the other light source has a wavelength range in or close to the visible light range. According to an embodiment of the invention, wherein the processor is further configured for determining a type of particle passing through the detection region from light signals detected by the other detector. According to an embodiment of the invention, the controller is further configured for activating the first detector when the particles pass through the detection region. According to an embodiment of the invention, the controller is further configured for activating the second detector when the particles pass through the detection region. According to a second aspect of the invention, an apparatus is presented comprising: a fluid channel comprising a bifurcation thereby splitting the fluid channel into a first and a second branch; a device according to any of the preceding claims, located in the first branch; wherein the first branch reconnects with the second branch, and wherein the device is located in the first branch in between the bifurcation and the reconnection of the first branch with the second branch; a fan for drawing air into the fluid channel, and located such that a pressure created by the fan draws air into the first and the second branch; and wherein the fan is adapted to: draw particles having a mass lower than a pre-determined mass into the second branch, and draw particles having a mass higher than the pre-determined mass into the first branch.

According to a third aspect of the invention, an air purifier is presented comprising a device or an apparatus according to the first or the second aspect of the invention.

In a fourth aspect of the invention, a method for detecting particles is presented, comprising: propagating particles through a detection region; illuminating the particles in the detection region using a first light source; detecting light from the particles illuminated by the first light source; determining a type of the particles from the detected light; wherein the method further comprises: detecting when the particles pass through the detection region; and wherein the first light source is operated with a pulsed current when particles pass through the detection region thereby preserving or extending the lifetime of the first light source, and wherein the pulsed current is selected beyond a continuous current damage threshold of the first light source thereby increasing light output of the first light source.

According to an embodiment of the invention, the first light source is a UV LED, and fluorescent light from illuminated particles is detected and used to determine the type of the particles.

According to an embodiment of the invention, wherein the first light source is an IR LED, and wherein IR light from illuminated particles is detected and used to determine the type of the particles.

According to an embodiment of the invention, wherein the method further comprises: illuminating the particles in the detection region using a second light source, the second light source having a different wavelength range than the first light source; detecting light from the particles illuminated by the second light source; and wherein determining the type of the particles is performed using the detected light from the particles illuminated by the first and the second light source.

According to an embodiment of the invention, wherein the first light source is a UV LED and wherein the second light source is an IR LED, and wherein the type of the particles is determined using fluorescent and infrared light from illuminated particles.

According to an embodiment of the invention, detecting when the particles pass through the detection region comprises: illuminating particles in the detection region with visible or near infrared light, and monitoring the scattered visible light.

According to an embodiment of the invention, determining the type of the particles from the detected light comprises: determining size of the particles from the scattered visible light.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Any reference signs in the claims shall not be construed as limiting the scope.

In the different drawings, the same reference signs refer to the same or analogous elements.

DETAILED DESCRIPTION OF THE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, fig., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Throughout the description reference is made to "continuous current damage threshold". This is a parameter supplied by manufactures of light sources such as light emitting diodes. The parameter refers to the maximum current that can be supplied to the light source without damaging the light source due to overheating. The invention solves the problems of state-of-the-art optical particle detectors being expensive, large and heavy by providing an optical particle detector which uses cheap light sources such as IR or UV light emitting diodes. A problem related to these light sources is their low light output. For optical particle detection, the light output of these light emitting diodes is not sufficient. This invention proposes to overdrive the light sources temporarily to substantially increase the light output of these light sources. The temporarily increased light output is sufficient for accurate detection. The result is a particle detector that is lightweight, cheap and accurate.

The embodiments of the invention are described below.

In a first aspect of the invention, a device for detecting particle is presented.

The detector comprises a fluid or fluidic channel, e.g. an air channel, for propagating particles. Optionally the device also comprises a fan for creating an air flow in the fluid channel. The fan is not essential as it may also be part of the apparatus in which the device is installed, e.g. an air purifier.

The device comprises a first light source positioned to illuminate particles passing or propagating through the fluid channel. Thus, particles are illuminated by the first light source. The first light source may be a light emitting diode. The first light source may be positioned along the fluid channel. The first light source is directed such that a particular volume of the fluid channel is illuminated. This volume is defined as the detection region or detection volume. All particles passing through the detection region are illuminated by the first light source.

The device comprises a first detector positioned to detect light originating from the detection region. Thus, light originating from the detection region can be recorded by the first detector. The first detector may be positioned along the fluid channel of the device. A particle passing through the detection region and which is illuminated by the first light source emits or scatters light signals. Depending on the wavelength range of the first light source, these light signals may be scattered light or fluorescence. The first detector is positioned to detect and record these light signals. The first detector may be positioned such that direct light from the first light source is not received by the first detector. For example, the first detector may be positioned adjacent to the first light source. Alternatively, the first detector may feature a filter adapted to filter out the wavelength range of the first light source.

The device comprises a means for detecting when a particle passes through the detection region. The means may be an optical or electrical means. The means is positioned such that it detect when a particle passes through the detection region. For example, the means is positioned along the fluid channel.

The device comprises a controller that is coupled to the means for detecting when a particle passes through the detection region. The controller may be a micro-controller. The controller is further coupled to the first light source. The means for detecting when a particle passes through the detection region informs the controller when a particle passes through the detection region. The controller is configured to operate the first light source with a first pulsed current when the particle passes through the detection region. The amplitude of the first pulsed current is selected beyond the continuous current damage threshold of the first light source. Thus, the controller is configured such that the amplitude of the first pulsed current is beyond a continuous current damage threshold of the first light source. Thus, the first light source is shortly supplied with a current that is higher than the maximum current which the first light source can withstand without breaking (due to overheating) assuming that the maximum current would be supplied continuously to the first light source. A first technical effect is that the first light source is only activated when a particle passes through the detection region. As an advantage, the life-time of the first light source is extended. Also, heat generation of the light source is reduced. A second technical effect is the light output of the light source increases because the first light source is driven with a current beyond the continuous current damage threshold of the first light source. The light output of the light source is multiplied, for example 10 to 100 times, compared to driving the first light source at the continuous current damage threshold of the first light source.

The device comprises a processor coupled to the first detector. The processor is configured for determining a type of the particle passing through the detection region using the light signal information supplied by the first detector.

According to an embodiment of the invention, the processor and the controller may be a single electronic component. For example, the controller may comprise the processor and fulfil its activities.

Figure 1:
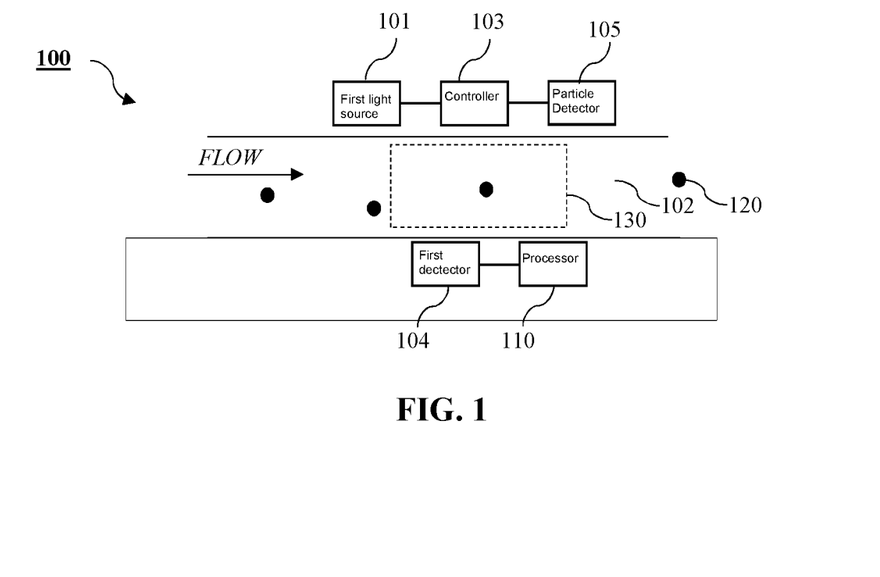
FIG. 1 illustrates an embodiment of a particle detector

FIG. 1 illustrates a schematic overview of an embodiment of a device 100 for detecting particles. The device 100 comprises a fluid channel 102 for propagating particles 120 through. Along the fluid channel 102 a first light source 101 is positioned. The first light source 101 is positioned and adapted for illuminating the detection region 130 in the fluid channel 102. The detection region 130 is a particular volume in the fluid channel 120. In this volume, detection of particles is performed. The first light source 101 is coupled to a controller 103. The controller is further coupled to a means for detecting particles 105 in the detection region 130. Along the fluid channel 102 a first detector 104 is present. The first detector 104 is positioned and adapted to detect emitted or scattered light from a particle illuminated by the first light source 101 in the detection region 130. The first detector 104 is coupled to a processor 110.

Figure 2:
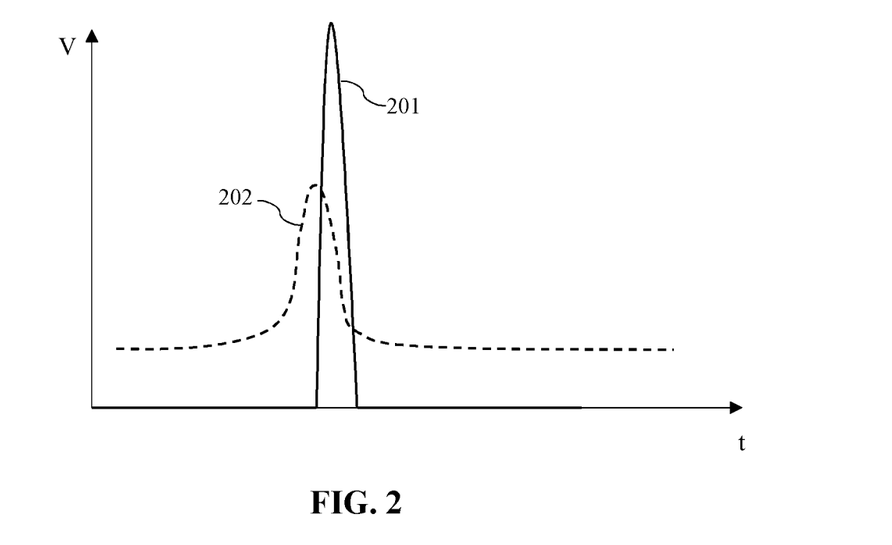
FIG. 2 illustrates the signals driving the particle detector

FIG. 2 illustrates electrical signals related to the operation of the device 100. When a particle propagates through the fluid channel 102 and enters the detection region 130, the means of detecting particles 105 detects this and transmits signal 202 to the controller 103. Upon receipt of signal 202 by the controller 103, the controller drives the first light source 101 with pulse signal 201 for a short period of time. The amplitude of pulse signal 201 is higher than the amplitude of the continuous current damage threshold which is defined in the specification of the light source. For example, at least twice the amplitude of the continuous current damage threshold. For example, at least ten times the amplitude of the continuous current damage threshold. As a result, the first light source 101 produces a strong light pulse that illuminates detection region 130 and consequently the particle 120 in the detection region 130. Emitted or scattered light from the illuminated particle is received and recorded by the first detector 104. The processor 110 receives this light information and determines from the light information the type of the particle in the detection region 130.

According to an embodiment of the invention, the first light source is an ultraviolet light emitting diode and the first detector is adapted to detect fluorescent light originating from the detection region 130 or, in other words, originating from the illuminated particle in the detection region 130. For example, the first detector is a photodetector for detecting green light, e.g. a photodiode. The processor is configured to determine the type of the particle based on the detected fluorescent light.

According to an embodiment of the invention, the first light source is an infrared light source and the first detector is adapted to detect infrared light originating from the detection region 130 or, in other words, originating from the illuminated particle in the detection region 130. For example, the first detector is an infrared photodetector, e.g. a photodiode. The processor is configured to determine the type of the particle based on the detected infrared light.

According to an embodiment of the invention, the first light source and the first light detector are located such that light from the first light source cannot be directly received by the first light detector. This increases accuracy of the detection as emission light of the first light detector does not reach the first light detector. For example, the first light detector is located adjacent to the first light source. Alternatively, the first light detector comprises a filter configured to filter out light having a wavelength range of the first light source.

According to an embodiment of the invention, the device further comprises a second light source, e.g. a light emitting diode, positioned to illuminate particles propagating through the fluid channel and through the detection region. The second light source has a wavelength range different than the wavelength range of the first light source. The device further comprises a second detector that is positioned to detect light signals from particles illuminated by the second light source in the detection region. Depending on the wavelength range of the second light source, these light signals may be scattered light or fluorescence. The second detector may be a photodiode. To preserve the lifetime of the second light source, the controller is configured to drive the second light source only when a particle passes the detection region. When a particle passes the detection region, the controller operates the second light source with a second pulsed current. The second pulsed current is selected beyond a continuous current damage threshold of the second light source. For example, the amplitude of the second pulsed current is beyond the amplitude of the continuous current damage threshold. Thus, in this embodiment, the controller is configured such that the amplitude of the second pulsed current is beyond a continuous current damage threshold of the second light source. Thus, the second light source is shortly supplied with a current that is higher than the maximum current which the second light source can withstand without breaking (due to overheating) assuming that the maximum current would be supplied continuously to the second light source. As an advantage, by driving the second light source for a short period of time with a current above its current damage threshold, e.g. 10 to 100 times above, the light output of the second light source is increased substantially. The processor is further configured for determining a type of particles passing through the detection region from light signals detected by the second detector. Thus, light signals detected by the first and the second light detectors are used by the processor to determine particle type.

Figure 3:
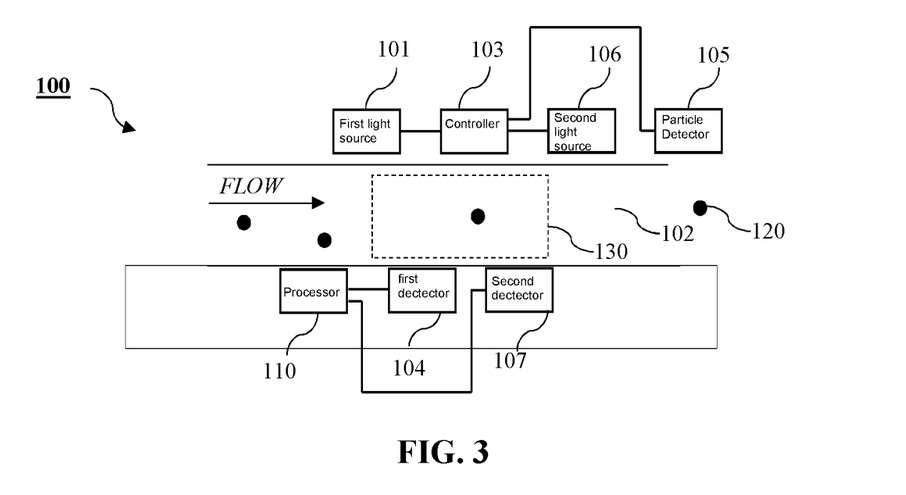
FIG. 3 illustrates an embodiment of a particle detector

FIG. 3 is a schematic overview of an embodiment of a device 100 for detecting particles 120. The device 100 comprises a fluid channel 102 for propagating particles 120 through. Along the fluid channel 102 a first light source 101 is positioned. The first light source 101 is positioned and adapted for illuminating the detection region 130 in the fluid channel 102. The detection region 130 is a particular volume in the fluid channel 120. In this volume, detection is performed. The first light source 101 is coupled to a controller 103. The controller 103 is further coupled to a means for detecting particles 105 in the detection region 130. Along the fluid channel 102 a first detector 104 is present. The first detector 104 is positioned and adapted to detect emitted or scattered light from a particle illuminated by the first light source 101 in the detection region 130. The first detector 104 is coupled to a processor 110. Along the fluid channel 102 a second light source 106 is positioned. The second light source 106 is positioned and adapted for illuminating the detection region 130 in the fluid channel 102. The second light source 106 is coupled to the controller 103. Along the fluid channel 102 a second detector 107 is present. The second detector 107 is positioned and adapted to detect emitted or scattered light from a particle illuminated by the second light source 106 in the detection region 130. The second detector 107 is coupled to the processor 110.

The signals illustrated in FIG. 2 may also be used to drive the components of the embodiment as illustrated in FIG. 3. When a particle propagates through the fluid channel 102 and enters the detection region 130, the means of detecting particles 120 detects this and transmits signal 202 to controller 103. Upon receipt of signal 202 by the controller 103, the controller drives the first light source 101 and the second light source 106 with current pulse signal 201 for a short period of time. The amplitude of current pulse signal 201 is higher than the amplitude of the continuous current damage threshold of the first 101 and the second 106 light source which is defined in the specification of the first 101 and the second 106 light sources. For example, at least twice the amplitude of the continuous current damage threshold of the light sources. For example, at least ten times the amplitude of the continuous current damage threshold of the light sources. As a result, the first 101 and the second 106 light sources each produce a strong light pulse that illuminates detection region 130 and consequently the particle 120 in the detection region 130. Emitted or scattered light from the detection region 130 and originating from the illuminated particle is received by the first 104 and the second 107 detector. The emitted or scattered light is a result of illuminating the particle 120 with the first and the second light source. The processor 110 receives this light information and determines from the light information the type of the particle in the detection region 130.

Depending on the type of light source used, the controller may be configured to generate different pulsed current signals. For example, the controller may be configured to: drive the first light source with a first pulsed current, and drive the second light source with a second pulsed current, wherein the properties of the first pulsed current is different from the properties of the second pulsed current. For example, the amplitude of the first pulsed current may be different from the second pulsed current. For example, the duration of the first pulsed current may be different from the second pulsed current. Thus, the controller is configured to generate a different pulsed current for each light source depending on the type of each light source. The selection of the properties of the pulses depends on the specification of the light sources.

According to a particular embodiment of the invention, the first light source has an ultraviolet wavelength range. For example, the first light source is an ultraviolet light emitting diode. For example, the wavelength range of the first light source is between 200 nm and 400 nm. For example, the first light source is a UVC LED with a wavelength range between 200 to 280 nm. For example, the first light source is a UVB LED with a wavelength range between 280 to 315 nm. For example, the first light source is a UVA LED with a wavelength range between 315 to 400 nm. The first light detector is adapted to detect fluorescence from particles illuminated with the first light source. The light detection wavelength range of the first detector may be between 200 nm and 400 nm, e.g. a wavelength range between 200 nm to 280 nm, e.g. a wavelength range between 280 nm to 315 nm, e.g. a wavelength range between 315 nm to 400 nm. In this embodiment, the second light source has an infrared wavelength range. For example, the second light source is an infrared light emitting diode. For example, the wavelength range of the second light source may be between 760 nm and 3000 nm. For example, the second light source is an infrared LED with a wavelength range of 940 nm to 950 nm. The second light detector is adapted to detect infrared light from particles illuminated with the second light source. The light detection wavelength range of the second detector may be between 760 nm and 3000 nm, e.g. a wavelength range between 940 to 950 nm.

According to an embodiment of the invention, the second light source and the second light detector are located such that light from the second light source cannot be directly received by the second light detector. This increases accuracy of the detection as emission light of the second light detector does not reach the second light detector. For example, the second light detector is located adjacent to the second light source. Alternatively, the second light detector comprises a filter configured to filter out light having a wavelength range of the second light source.

According to an embodiment of the invention, the means for detecting when particles pass through the detection region is an optical detector configured to detect when a particle passes through the detection region. The means comprises another light source positioned along the fluid channel and adapted for illuminating particles in the detection region. The other light source may be a light emitting diode, e.g. a light emitting diode. For example, the other light source may be a near infrared or a visible light emitting diode such as a red light emitting diode. The other light source is configured to be continuously active thereby continuously illuminating the detection region. Another detector is positioned along the fluid channel and is adapted to detect light from particles illuminated by the other light source. The other detector may be a photodetector such as a photodiode. The other detector is configured to be continuously active thereby continuously detecting light originating from the detection region. When a particle is detected in the detection, scattered light detected by the other detector gives rise to a peak signal, see signal 202 in FIG. 2. The peak signal triggers the controller to activate the first light source, or the first and the second light sources using a pulsed signal 201.

According to an embodiment of the invention, the processor is further configured for determining a type of particle passing through the detection region from light signals detected by the means for detecting when particles pass through the detection region. For example, when visible light is used to detect when a particle passes through the detection region, the light signals originating from the particle illuminated with the visible light may be used to determine the size of the particle. The size may be used as a first classification property.

According to an embodiment of the invention, the other light source and the other light detector are located such that light from the other light source cannot be directly received by the other light detector. For example, the other light detector is located adjacent to the other light source. Alternatively, the other light detector comprises a filter configured to filter out light having a wavelength range of the other light source.

According to an embodiment of the invention, the controller is configured to activate the first detector only when a particle passes through the detection region. As an advantage, the lifetime of the first detector is prolonged, heat generation is reduced and power is preserved.

According to an embodiment of the invention, the controller is configured to activate the second detector only when a particle passes through the detection region. As an advantage, the lifetime of the second detector is prolonged, heat generation is reduced and power is preserved.

Figure 4:
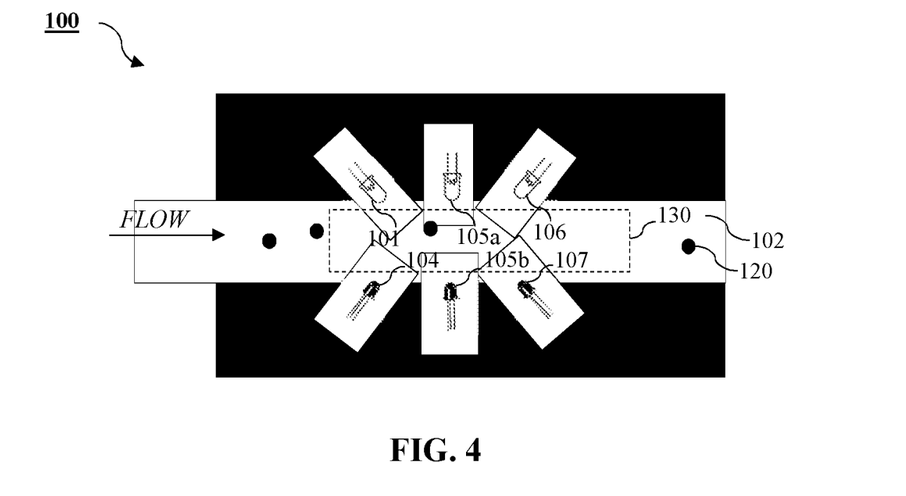
FIG. 4 illustrates an embodiment of a particle detector

FIG. 4 illustrates a particular embodiment of the invention. Three LEDs 101, 105a, 106 are positioned along fluid channel 102. Particles 120 passing through detection region 130 are detected by an optical detecting means which comprises a visible-light LED 105a and a visible-light photodiode 105b. Further, particles in the detection region 130 are simultaneously illuminated by an IR LED 101 and a UV LED 106. Scattered light from particles illuminated by the IR LED 101 is detected by infrared photodiode 104. Fluorescence from particles illuminated by the UV LED 106 are detected by photodiode 107.

Figure 5:
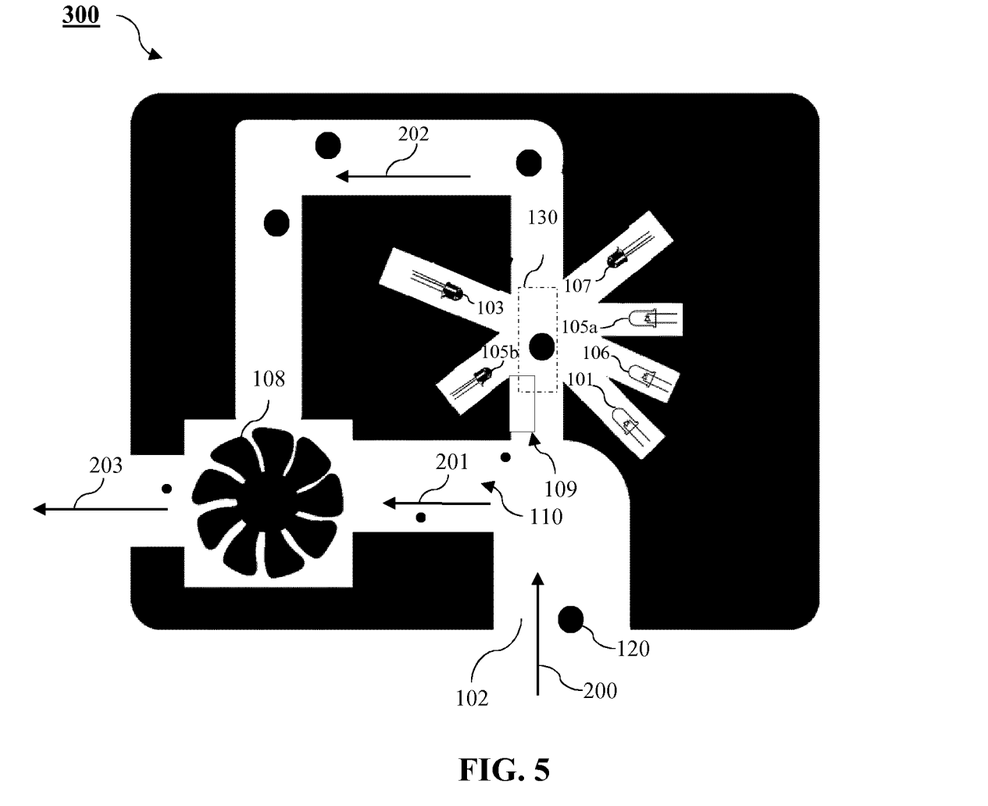
FIG. 5 illustrates an embodiment of an apparatus featuring a particle detector as presented in this disclosure

An apparatus for detecting particles according to a second aspect of the invention is illustrated in FIG. 5. Fluid channel 102 features a bifurcation thereby splitting the fluid channel up in a first 109 and a second branch 110. The first 109 and the second branch 110 may also be referred to as a first and a second fluidic channel. These channels are capable of propagating air. In the first branch 109 a device 100 as illustrated in FIG. 4 is located for detecting particles. The apparatus 300 further features a fan 108 configured for drawing air in the fluid channel 102, illustrated with arrow 200. Further, the fan 108 is located in the second branch 110. The fan 108 is adapted such that particles 120 having a mass lower than a pre-determined mass are drawn into the second branch 110, illustrated with arrow 201. Particles 120 having a mass larger than the pre-determined mass flow into the first branch 109, illustrated with arrow 202. These particles 120 can be detected with the device 100 in the first branch 109. Thus, the fan 108 creates a filtration action whereby only particles having a pre-determined mass or higher enter the first branch 109. Downstream of the device 100, the first branch 109 reconnects with the second branch 110 such that the a pressure, e.g. underpressure, created by the fan 108 in the second branch 110 also generates an air flow in the first branch 109 thereby drawing in the particles having a mass larger than the pre-determined mass. The apparatus 300 may further comprise an exhaust located downstream of the reconnection of the first branch 109 with the second branch 110. It is an advantage of the invention that the abrupt change of the air flow created by the bifurcation reduces disturbance of the detection performed by device 100 by ultra-fine particles. This increases the accuracy of the device.

The configuration of the fan 108, such as its capacity and/or speed are determined by the desired filtration action and the type of particles that can be detected by the device 100.

In a third aspect of the invention, an air purifier is presented comprising a device or an apparatus according to the first or the second aspect of the invention. The use of such a device or apparatus in an air purifier reduces total cost of the air purifier whilst keeping accuracy of the particle detection high and thereby increasing air purification efficiency. Increasing the accuracy of the particle sensor enables a smart operation mode of the air purifier. For example, at high pollution levels, the purifier runs at a high speed. At lower pollution levels, e.g. below a safety limit, the purifier may run at a lower speed. This is an ideal way to operate an air purifier, regarding "offer clean air to consumer" and "ensure a safe environment" versus noise, electricity expenditure and lifetime of an air filter. Thus, by accurately detecting the particle type a more advanced usage mode of an air purifier is enabled. For example for pollen (bigger particle) pollution, and PM2.5 (smaller particle) pollution, different ways to run the air purifier will enable a higher purification efficiency.

In a fourth aspect of the invention, a method for detecting particles is presented. The method comprises, in a first step, generating an air flow to propagate a particle through a detection region. In a second step it is detected when the particle passes through the detection region. This may be done by illuminating the particles in the detection region with visible light (e.g. red or near infrared light) and monitor the scattered visible light coming from the illuminated particles in the detection region. In a third step, the particle in the detection region is illuminated using a first light source that is driven with a pulsed current above its continuous current damage threshold only when the particle is detected in the detection region. In a fourth step, light signals from the particle and generated by illuminating the particle with the particular type of the first light source are detected and used to determine the type of the particle. The first light source may be an LED. For example, an infrared or an ultraviolet LED.

According to an embodiment of the invention, the method comprises a step of illuminating the particle in the detection region using a second light source that is driven with a pulsed current above its continuous current damage threshold only when the particle is detected in the detection region. Light signals from the particle and generated by illuminating the particle with the particular type of the second light source are detected and used to determine the type of the particle. The second light source is different from the first light source. For example second light source may be an LED. For example, when the first light source is an IR LED, the second light source is an UV LED. When the first light source is an UV LED, the second light source is an IR LED. Thus, in this embodiment scattered light and fluorescence are used to determine the type of the particle in the detection region.

According to an embodiment of the invention, the scattered visible light which was used to detect a particle in the detection region may further be used to determine the type of the particle in the detection region, e.g. determine size of the particle.

The width and amplitude of the first or second pulsed currents as described above may depend on the manufacturer (specification sheet of the light source), the type of the light source and the required light output to allow detection of the type of particle under investigation. A person skilled in the art may perform experiments with different types of light sources to determine the ideal width and amplitude of the pulsed current for a certain type of light source.

For light sources such as LEDs, the maximum current that can be supplied to the light source without damaging the light source can typically be found under the section maximum ratings of the LED specification sheets. The term "continuous current damage threshold" may be defined as the "maximum forward current" or "forward current".

Figure 6:
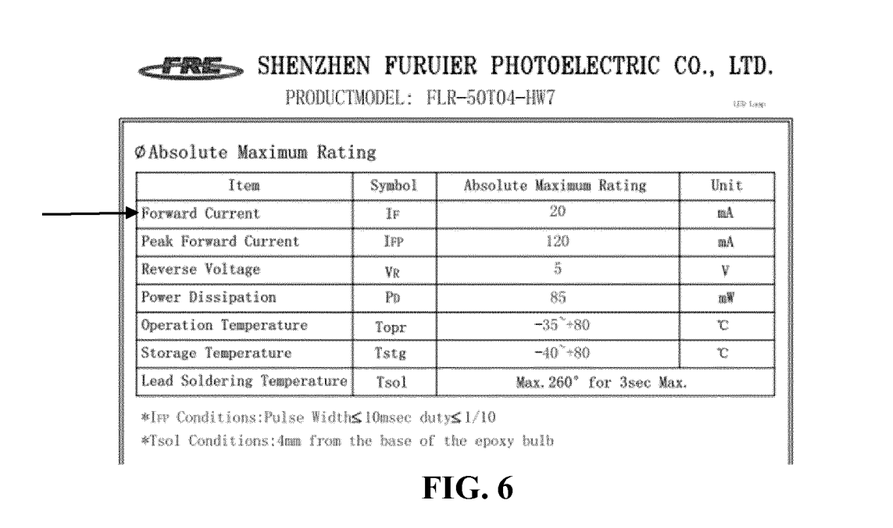
FIG. 6 illustrates a part of a specification sheet for a LED model, typically supplied by the manufacturer The drawings are only schematic and are non-limiting. In the drawings, the size of some of the elements may be exaggerated and not drawn on scale for illustrative purposes.

FIG. 6 illustrates a part of a specification sheet of a LED manufactured by the company SHENZHEN FURUIER PHOTOELECTRIC CO., LTD. The product model is: FLR-50T04-HW7. For this particular model, the "continuous current damage threshold" is defined in the specification sheet as the "forward current" and equals 20 mA. For this particular model, the controller would be configured such that the amplitude of the pulsed current supplied to the light source is beyond 20 mA.

In embodiments, the supplied pulsed current to the first and/or second light sources may be a multiple of the continuous current damage threshold of the light sources, e.g. 2, 3, 4, 5, 10-100 times the continuous current damage threshold, depending on the duration of the pulse and impact of the supplied current on the light source. As described above, the duration and amplitude of the supplied current pulse should be measured and tested by the person skilled in the art as this is dependent on the specific manufacturing technology of the light source. Ideally, the supplied current pulse should ensure sufficient light output of the light source to allow good detection without permanently damaging the light source.

The invention claimed is:
1. A device for detecting particles, comprising:
  a first light source configured to:
    illuminate a detection region of the device, wherein the first light source is a LED;
  a first detector configured to:
    detect light signals in response to reflections of light by particles illuminated by the first light source in the detection region;
  a processor configured to
    determine a type of the particles passing through the detection region from light signals detected by the first detector;
  a means configured to:
    detect particles within the detection region; and
    generate a detection signal in response to detection of said particles within said detection region;
  a controller coupled to the means and configured to:
    receive the detection signal; and
    operate the first light source with a first pulsed signal in response to said received detection signal,
  wherein said first pulse signal comprises:
  a current amplitude greater than a continuous current damage threshold of the first light source for a first duration selected to avoid overheating of said first light source, wherein the continuous current damage threshold is a maximum current that can be continuously supplied to the first light source without damaging the first light source due to overheating.

2. The device according to claim 1, wherein the first light source is a UV LED, and wherein the first detector is adapted to detect fluorescence.

3. The device according to claim 1, wherein the first light source is an IR LED, and wherein the first detector is adapted to detect IR light.

4. The device according to claim 1, further comprising:
a second light source configured to:
illuminate the detection region, the second light source having a wavelength range different than the first light source, and
a second detector configured to:
detect light signals from particles within the detection region illuminated by the second light source, and
generate a second detection signal in response to detection of said particles within said detection region
wherein the controller is configured to:
receive the second detection signal;
operate the second light source with a second pulsed signal in response to the received second detection signal, wherein the second pulse signal comprises:
an amplitude of the second pulsed signal greater than a continuous current damage threshold of the second light source for a second duration, said second duration selected to avoid overheating of said second light source wherein the continuous current damage threshold is a maximum current that can be continuously supplied to the second light source without damaging the second light source due to overheating, and
wherein the processor is further configured for determining a type of particles passing through the detection region from light signals detected by the second detector.

5. The device according to claim 4, wherein the second light source is a LED.

6. The device according to claim 4, wherein the first light source has an ultraviolet wavelength range, the first detector is adapted to detect fluorescence, the second light source has an infrared wavelength range, and the second detector is adapted to detect infrared light.

7. The device according to claim 4, wherein the controller is further configured to:
activate the second detector when the particles pass through the detection region.

8. The device according to claim 1,
wherein the means for detecting when particles pass through the detection region comprises:
another light source configured to:
illuminate the detection region; and
another detector configured to:
receive light from particles in the detection region illuminated by the other light source.

9. The device according to claim 8, wherein the other light source is a light emitting diode.

10. The device according to claim 8, wherein the other light source has a wavelength range in or close to the visible light range.

11. The device according to claim 8, wherein the processor is further configured for determining a type of particle passing through the detection region from light signals detected by the other detector.

12. The device according to claim 1, wherein the controller is further configured to:
activate the first detector when the particles pass through the detection region.

13. An apparatus, comprising:
a fluid channel comprising a bifurcation splitting the fluid channel into a first and a second branch;
a device located in the first branch, said device comprising:
a first light source configured to:
illuminate a detection region of the device, wherein the first light source is a LED;
a first detector configured to:
detect light signals in response to reflections of light by particles illuminated by the first light source in the detection region;
a processor configured to
determine a type of the particles passing through the detection region from light signals detected by the first detector;
a means configured to:
detect particles within the detection region; and
generate a detection signal in response to detection of said particles within said detection region;
a controller coupled to the means and configured to:
receive the detection signal; and
operate the first light source with a first pulsed signal in response to said received detection signal,
wherein said first pulse signal comprises:
a current amplitude greater than a continuous current damage threshold of the first light source for a first duration selected to avoid overheating of said first light source, wherein the continuous current damage threshold is a maximum current that can be continuously supplied to the first light source without damaging the first light source due to overheating;
wherein the first branch reconnects with the second branch, and wherein the device is located in the first branch in between the bifurcation and the reconnection of the first branch with the second branch;
a fan for drawing air into the fluid channel, and located such that a pressure created by the fan draws air into the first and the second branch; and wherein the fan is adapted to: draw particles having a mass lower than a pre-determined mass into the second branch, and draw particles having a mass higher than the pre-determined mass into the first branch.

14. An air purifier comprising:
a device comprising:
a first light source configured to:
illuminate a detection region of the device, wherein the first light source is a LED;
a first detector configured to:
detect light signals in response to reflections of light by particles illuminated by the first light source in the detection region;
a processor configured to
determine a type of the particles passing through the detection region from light signals detected by the first detector;
a means configured to:
detect particles within the detection region; and
generate a detection signal in response to detection of said particles within said detection region;
a controller coupled to the means and configured to:
receive the detection signal; and
operate the first light source with a first pulsed signal in response to said received detection signal, wherein said first pulse signal comprises:
a current amplitude greater than a continuous current damage threshold of the first light source for a first duration selected to avoid overheating of said first light source, wherein the continuous current damage threshold is a maximum current that can be continuously supplied to the first light source without damaging the first light source due to overheating.

* * * * *